United States Patent [19]

Kanda et al.

[11] 4,267,806
[45] May 19, 1981

[54] HIGH COMPRESSION TYPE INTERNAL COMBUSTION ENGINE

[75] Inventors: Mutsumi Kanda; Kiyoshi Nakanishi, both of Susono; Katsuhiko Motosugi, Toyota, all of Japan

[73] Assignee: Toyota Jidosha Kogyo Kabushiki Kaisha, Toyota, Japan

[21] Appl. No.: 30,864

[22] Filed: Apr. 17, 1979

[30] Foreign Application Priority Data

May 12, 1978 [JP] Japan .................................. 53-5586

[51] Int. Cl.³ .............................................. F02B 3/00
[52] U.S. Cl. ................................... 123/287; 123/260; 123/193 H; 123/263
[58] Field of Search ............ 123/191 R, 191 M, 30 C, 123/30 D, 193 P, 193 H, 193 P, 286, 287, 260, 263

[56] References Cited

U.S. PATENT DOCUMENTS

| | | | |
|---|---|---|---|
| 2,126,939 | 8/1938 | Winfield | 123/191 M |
| 3,113,560 | 12/1963 | Weslake | 123/193 H |
| 3,923,015 | 12/1975 | Mukai et al. | 123/193 H |
| 4,000,722 | 1/1977 | May | 123/32 C |
| 4,121,544 | 10/1978 | May | 123/191 M |

Primary Examiner—Craig R. Feinberg
Attorney, Agent, or Firm—Kenyon & Kenyon

[57] ABSTRACT

A high compression type internal combustion engine comprising a cylinder head having a flat inner wall, and a piston having a flat top face. The flat inner wall and the flat top face form a squish area therebetween. A recess having a lung shaped cross-section is formed in the cylinder head. A shallow groove is formed in the flat inner wall of the cylinder head so as to extend from the intake valve to the recess. The exhaust valve is arranged on the top of the recess. A depression connected to the recess is formed in the shallow groove. The spark plug is arranged in the depression.

10 Claims, 8 Drawing Figures

_(4,267,806)_

HIGH COMPRESSION TYPE INTERNAL COMBUSTION ENGINE

DESCRIPTION OF THE DISCLOSURE

The present invention relates to an internal combustion engine, and particularly relates to the construction of the combustion chamber of a high compression type internal combustion engine.

As a method of improving the specific fuel consumption, it is known to increase the compression ratio of an engine. However, if normal gasoline is used in a conventional high compression engine, knocking occurs and, as a result, the exhaust emission and specific fuel consumption deteriorate. To prevent knocking in such a conventional engine, it is necessary either to use a gasoline having an octane which is higher than that of normal gasoline or, if normal gasoline having a low octane is used, it is necessary to increase the burning velocity. In addition, to increase the output power of the engine, it is preferable that the peak pressure in the combustion chamber occur immediately after top dead center. In other words, if the burning velocity can be increased enough to permit the ignition timing at MBT (minimum advance for best torque) to be retarded so that the ignition is carried out near top dead center in a high compression type engine without causing knocking, a satisfactory high output can be obtained and, at the same time, the exhaust emission and specific fuel consumption can be improved even if gasoline having a low octane is used. However, in a conventional high compression engine when normal gasoline is used, even if the ignition timing at MBT is retarded so that the ignition is carried out near top dead center, knocking occurs and, as a result, the exhaust emission and a specific fuel consumption deteriorate.

An object of the present invention is to provide a high compression type internal combustion engine capable of having improved exhaust emission and specific fuel consumption, compared to the prior art, even if normal gasoline is used.

According to the present invention, there is provided an internal combustion engine comprising: a cylinder block having a cylinder bore therein; a piston reciprocally movable in said cylinder bore and having a flat top face; a cylinder head having a circular inner wall portion covering said cylinder bore and comprising a flat portion substantially parallel to the flat top face of the piston and a recessed portion which is arranged at a periphery of said circular inner wall portion and has a circumferential wall and a top wall, said flat portion being arranged at a position close to the flat top face of said piston when the latter is positioned at top dead center for forming a squish area therebetween, said piston and said circular inner wall portion of said cylinder head forming a combustion chamber therebetween; an intake valve arranged on said flat portion and having a valve head which has a front face exposed to said combustion chamber, the front face of said valve head being approximately coplanar with said flat portion; an exhaust valve arranged on the top wall of said recessed portion; a groove formed on said flat portion and extending from the valve head of said intake valve to said recessed portion at least part of, said groove having an approximately uniform depth which is slightly larger than the clearance between said flat portion and the flat top face of said piston when the latter is positioned at top dead center; and a spark plug having a spark gap arranged in said groove.

The present invention may be more fully understood from the description of preferred embodiments of the invention set forth below, together with the accompanying drawings.

DESCRIPTION OF PREFERRED EMBODIMENTS

Figure 1:
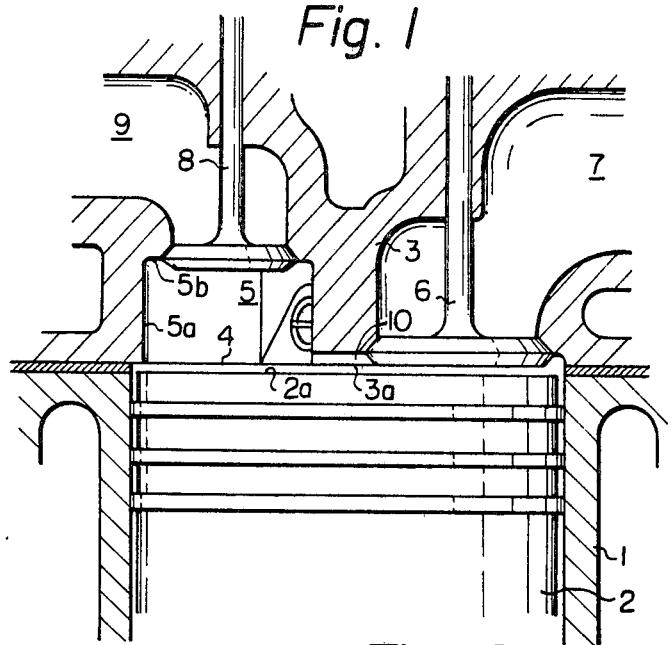
FIG. 1 is a cross-sectional view of an embodiment according to the present invention, taken along the line I—I in FIG. 2.
Figure 2:
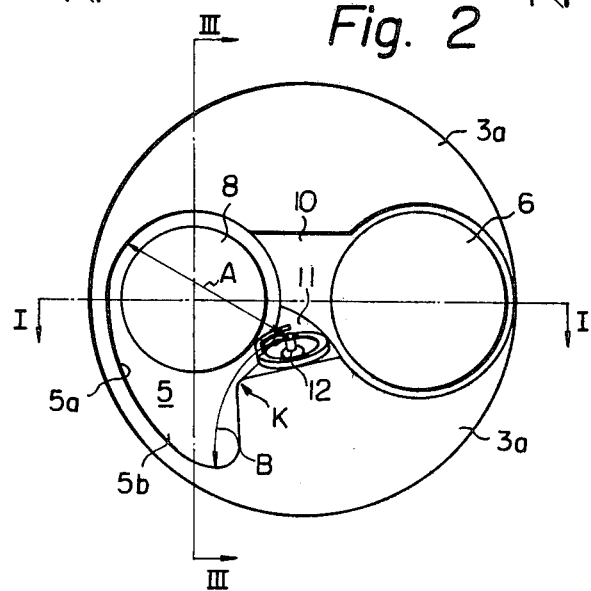
FIG. 2 is a bottom view of the cylinder head illustrated in FIG. 1.
Figure 3:
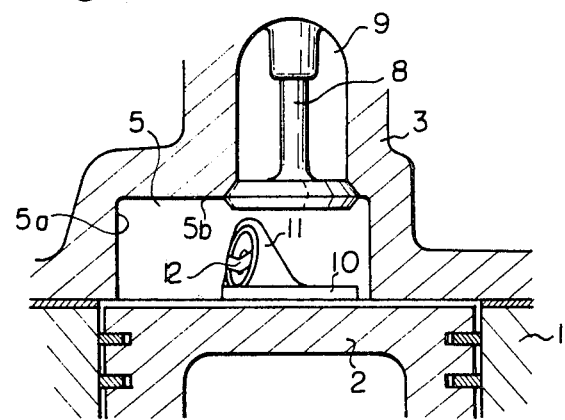
FIG. 3 is a cross-sectional side view taken along the line III—III in FIG. 2.

Referring to FIGS. 1 through 3, 1 designates a cylinder block, 2 a piston having a flat top face 2a and reciprocally moving in the cylinder block 1, 3 a cylinder head having a flat inner wall 3a and fixed onto the cylinder block 1, and 4 a combustion chamber formed between the piston 2 and the cylinder head 3; 5 designates a vertically extending recess formed in the cylinder head 3 at the periphery of the flat inner wall 3a of the cylinder head 3; 6 an intake valve, 7 an intake passage, 8 an exhaust valve and 9 an exhaust passage. The recess 5 has a vertically extending circumferential wall 5a and a flat top 5b parallel to the top face of the piston. In addition, as is illustrated in FIG. 2, the recess 5 has a lung shaped cross-section extending in the circumferential direction of the combustion chamber 4 and having a convex contour portion K, and the exhaust valve 8 is arranged on the flat top 5b. On the other hand, the intake valve 6 is arranged on the flat inner wall 3a of the cylinder head 3, so that the front face of the valve head of the intake valve 6, which is exposed to the combustion chamber 4, is coplanar with the flat inner wall 3a. The piston 2 and the cylinder head 3 are so constructed that the clearance between the flat top face 2a of the piston 2 and the flat inner wall 3a of a cylinder head 3 is less than 1.25 mm when the piston 2 is positioned at top dead center, as illustrated in FIG. 1. Consequently, a horizontally extending flat squish area is formed between the flat top face 2a of the piston 2 and the flat inner wall 3a of the cylinder head 3 when the piston 2 is positioned at top dead center. As will be understood from FIG. 2, this squish area is formed so as to enclose the recess 5 and so that it has an area of more than 40 percent relative to the cross-sectional area of the cylinder bore of the engine. A shallow groove 10, having a uniform depth and extending from the valve head of the intake valve 6 towards the recess 5, is formed on the flat inner wall 3a of the cylinder head 3. As illustrated in FIG. 2, the groove 10 is arranged at the central portion of the combustion chamber 4 and has a width which is approximately equal to the diameter of the valve head of the exhaust valve 8. In addition, a depression 11 connected to the inside of the recess 5 is formed in the groove 10, and the electrode of a spark plug 12 is arranged in the depression 11. Consequently, the electrode of the spark plug 12 is positioned at approximately the center of the combustion chamber 4. As illustrated in FIGS. 2 and 3, the inner wall of the depression 11, on which the electrode of the spark plug 12 is arranged, is slightly inclined towards the recess 5 with respect to a vertical plane passing through the axis of the intake valve 6 and the axis of the exhaust valve 8. This arrangement of the inner wall of the depression 11 is very important. According to the experiments conducted by the inventors, it is impossible to prevent knocking from occurring if the inner wall of the depression 11, on which the electrode of the spark plug 12 is arranged, is directed towards the intake valve 6.

In operation, during the intake stroke a combustible mixture is introduced into the combustion chamber 4 via the intake valve 6. Then the combustible mixture in the combustion chamber 4 is gradually compressed as the piston 2 moves upwards. When the piston 2 reaches about 30 degrees before top dead center, a squish flow is directly spouted, or spouted via the groove 10, into the recess 5 from the squish area formed between the flat top face 2a of the piston 2 and the flat inner wall 3a of the cylinder head 3. The squish flows entering the recess 5 from around its periphery come into violent contact with each other; as a result, a stong turbulence is created in the recess 5. When the combustible mixture is then ignited by the spark plug 12, a flame core is created around the electrode of the spark plug 12 and rapidly grows towards the recess 5, due to the squish flow in the groove 10. Since a strong turbulence is created in the recess 5 and since the spark plug 12 is arranged near the convex contour portion K of the recess 5, so that both flame propagation distances A and B (FIG. 2) between the spark plug 12 and the points on the vertical circumferential wall 5a most remote from the spark plug 12 are minimized, the burning velocity is considerably increased. When the piston 2 reaches top dead center, the distance between the flat top face 2a of the piston 2 and the flat inner wall 3a of the cylinder head 3 is reduced below the quench distance. As a result, the flame cannot propagate into the squish area. Subsequently, when the piston 2 moves downwards and reaches 15 through 25 degrees after top dead center, the flame and the unburned mixture which are located in the recess 5 and the groove 10 are sucked into the squish area due to the temporary pressure drop occurring in the squish area, so that the flame propagates into the squish area at extremely high speed. As mentioned above, since the spark plug 12 is arranged at approximately the center of the combustion chamber 4, the flame which has grown around the spark plug 12 can rapidly propagate into the entire squish area when the piston 2 moves downwards. As a result of this, the burning velocity is still further increased.

Figure 4:
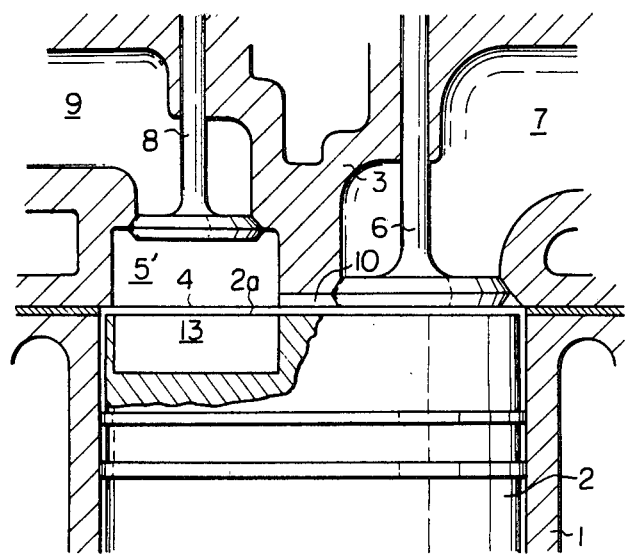
FIG. 4 is a cross-sectional side view of an alternative embodiment according to the present invention.
Figure 5:
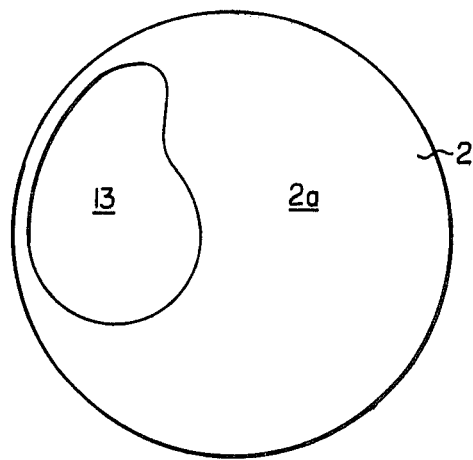
FIG. 5 is a plan view of the piston illustrated in FIG. 4.

FIGS. 4 and 5 illustrate an alternative embodiment. As mentioned previously, it is possible to increase the burning velocity by arranging the spark plug 12 in such a manner as to make the flame propagation distances A and B as short as possible. Consequently, to further shorten the flame propagation distances the depth of the recess 5' in this embodiment is reduced as compared with that of the recess 5 illustrated in FIG. 1. In addition, another recess 13 aligned with the recess 5' is formed on the flat top face 2a of the piston, so that the recess 13 has a volume which is the same as that of the recess 5'.

Figure 6:
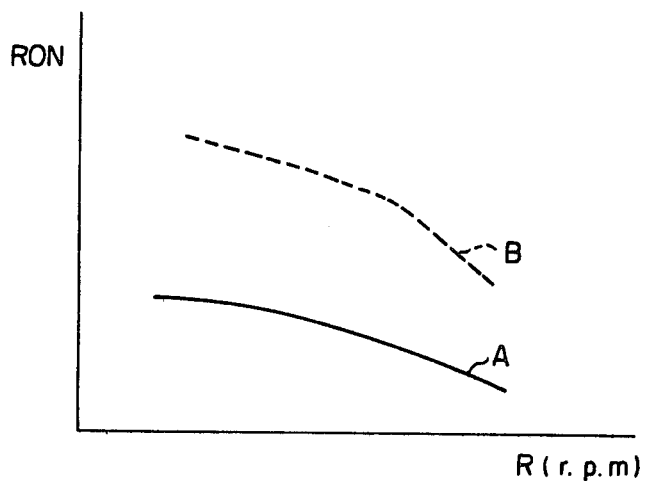
FIG. 6 is a graph showing change in Research Octane Number versus engine speed.
Figure 7:
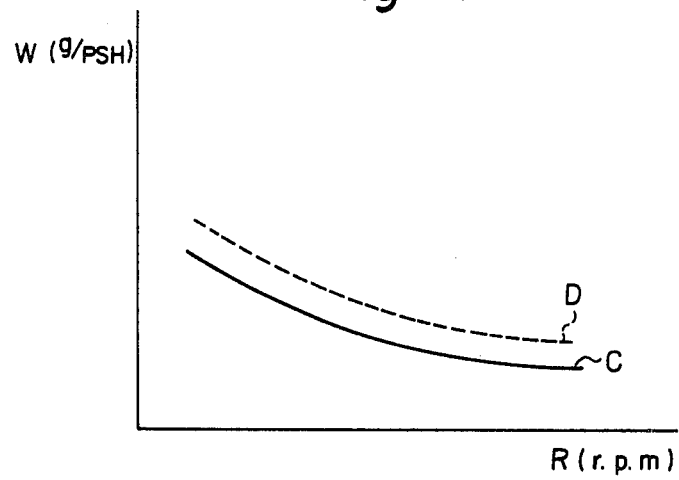
FIG. 7 is a graph showing change in specific fuel consumption versus engine speed.
Figure 8:
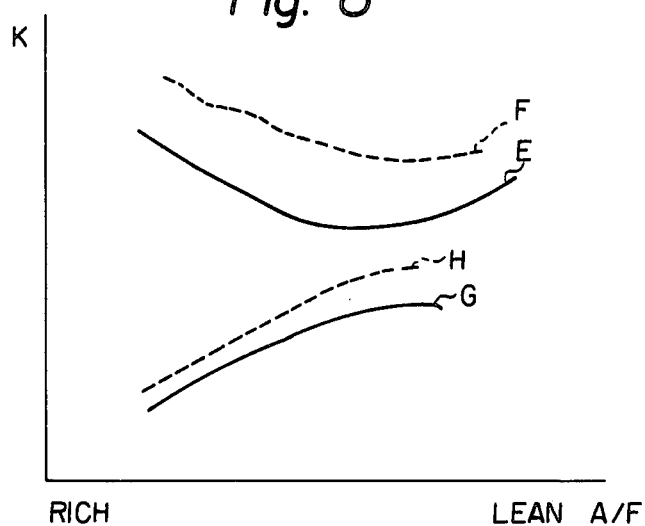
FIG. 8 is a graph showing change in amount of exhaust emission versus air-fuel ratio.

FIGS. 6 through 8 show the results of experiments comparing a high compression type engine illustrated in FIG. 1 with a prior engine. The prior engine had a wedge shaped combustion chamber, a compression ratio which was equal to that of the engine according to the present invention, and a spark plug arranged at a position near the apex of the wedge shaped combustion chamber. In FIG. 6, the ordinate RON indicates Research Octane Number, and the abscissa R indicates the number of revolutions per minute of an engine (r.p.m.); the solid line A indicates the engine according to the present invention, and the broken line B indicates the prior engine. In FIG. 7, the ordinate W indicates the specific fuel consumption (g/Psh), and the abscissa R indicates the number of revolutions per minute of a engine (r.p.m.); the solid line C indicates the engine according to the present invention, and the broken line D indicates the prior engine. In FIG. 8, the ordinate K indicates the amount of exhaust emission (g/Psh), and the abscissa A/F indicates the air-fuel ratio; the solid lines E and G indicate the amount of HC and $NO_x$, respectively, in the engine according to the present invention, and the broken lines F and H indicate the amount of HC and $NO_x$, respectively, in the prior engine.

According to the present invention, since the burning velocity is considerably increased, the ignition timing at MBT could be retarded so that the ignition was carried out near top dead center without knocking. As a result of this, as illustrated in FIG. 6, the Research Octane Number could be reduced as compared with that in the prior engine. In addition, as illustrated in FIG. 7, the specific fuel consumption was improved, and as illustrated in FIG. 8, the exhaust emission was improved.

While the invention has been described by reference to specific embodiments chosen for purposes of illustration, it should be apparent that numerous modifications could be made thereto by those skilled in the art without departing from the spirit and scope of the invention.

What is claimed is:

1. An internal combustion engine comprising:
a cylinder block having a cylinder bore therein;
a piston reciprocally movable in said cylinder bore and having a flat top face;
a cylinder head having a circular inner wall portion covering the cylinder bore and comprising a flat portion substantially parallel to the top face of the piston and a recessed portion which is arranged adjacent to the periphery of said inner wall and has a circumferential wall and a top wall, said flat portion being arranged at a position close to the flat top face of said piston when the latter is positioned at top dead center for forming a squish area therebetween, said piston and said circular inner wall portion of said cylinder head forming a combustion chamber therebetween;
an intake valve arranged on said flat portion and having a valve head which has a front face exposed to said combustion chamber, the front face of said valve head being approximately coplanar with said flat portion;
an exhaust valve arranged on the top wall of said recessed portion and having a valve head;
a groove formed in said flat portion and extending from the valve head of said intake valve to said recessed portion, said groove having an approximately uniform depth which is slightly larger than the clearance between said flat portion and the flat top face of said piston when the latter is positioned at top dead center;

a depression formed in said groove adjacent to and opening into said recessed portion, said depression having a flat inner wall which is inclined downwardly and slightly towards said recessed portion with respect to a plane parallel to the axis of the cylinder bore and passing through the centers of said intake and exhaust valve heads; and a spark plug arranged in a bore in said inclined wall of the depression in said groove and having a spark gap located approximately on the axis of the cylinder bore, so that the flame propagation distances to the most remote surfaces of the circumferential walls of the recessed portion are minimized.

2. An internal combustion engine as claimed in claim 1, wherein said clearance between said flat portion of said cylinder head and the flat top face of said piston when the latter is positioned at top dead center is less than 1.25 mm.

3. An internal combustion engine as claimed in claim 1, wherein said squish area is more than 40 percent of the cross-sectional area of said cylinder bore.

4. An internal combustion engine as claimed in claim 1, wherein the spark gap of said spark plug is arranged in said depression of said groove in the vicinity of said exhaust valve.

5. An internal combustion engine as claimed in claim 1, wherein a recess aligned with said recessed portion is formed on the flat top face of said piston.

6. An internal combustion engine as claimed in claim 1, wherein said groove has a width which increases gradually towards said recessed portion.

7. An internal combustion engine as claimed in claim 1, wherein said groove is arranged at approximately the center of said combustion chamber.

8. An internal combustion engine as claimed in claim 7, wherein said groove has a width which is approximately equal to the diameter of the valve head of said exhaust valve.

9. An internal combustion engine as claimed in claim 1, wherein the circumferential wall of said recessed portion extends substantially parallel to the axis of the cylinder bore.

10. An internal combustion engine as claimed in claim 9, wherein said recessed portion has a lung shaped cross-section extending in a circumferential direction of said combustion chamber from said exhaust valve and having a convex contour portion, the spark gap of said spark plug being arranged in the vicinity of said convex contour portion.

* * * * *

UNITED STATES PATENT AND TRADEMARK OFFICE
CERTIFICATE OF CORRECTION

PATENT NO. : 4,267,806
DATED : May 19, 1981
INVENTOR(S) : Mutsumi Kanda, et al

It is certified that error appears in the above—identified patent and that said Letters Patent is hereby corrected as shown below:

On the title page:

In the Foreign Application Priority Data change

"53-5586" to --53-55686--.

Signed and Sealed this

Eighteenth Day of August 1981

[SEAL]

Attest:

Attesting Officer

GERALD J. MOSSINGHOFF

Commissioner of Patents and Trademarks